United States Patent [19]
Cuellar et al.

[11] Patent Number: 5,482,745
[45] Date of Patent: Jan. 9, 1996

[54] SPRAY COATING PROCESS AND APPARATUS

[75] Inventors: Salome J. Cuellar; Robert J. Radawski, both of Fort Wayne; Michael R. Barth, Auburn; Jack V. Jerraid, Fort Wayne; John A. Keyes, Kendallville; Earl V. Gleason, Fort Wayne, all of Ind.

[73] Assignee: Dana Corporation, Toledo, Ohio

[21] Appl. No.: 158,423

[22] Filed: Nov. 29, 1993

[51] Int. Cl.⁶ .................................................. B05D 1/02
[52] U.S. Cl. ........................ 427/421; 118/300; 118/313; 118/314; 118/326
[58] Field of Search ............................ 427/421; 118/326, 118/300, 313, 314

[56] References Cited

U.S. PATENT DOCUMENTS

| | | | |
|---|---|---|---|
| 2,685,376 | 8/1954 | Boyer | 214/16 |
| 2,734,479 | 2/1956 | Norris | 118/326 |
| 2,763,575 | 9/1950 | Bede | 117/104 |
| 3,905,329 | 9/1975 | Cone et al. | 118/602 |
| 4,538,542 | 9/1985 | Kennon et al. | 118/326 |
| 4,600,608 | 7/1986 | Ankrett | 427/424 |
| 4,687,686 | 8/1987 | Stofleth et al. | 427/421 |

*Primary Examiner*—Shrive Beck
*Assistant Examiner*—David M. Maiorana
*Attorney, Agent, or Firm*—Oldham, Oldham & Wilson Co.

[57] ABSTRACT

A continuous spray coating apparatus and process generally comprises a housing defining a closed coating chamber, the coating chamber having inlet and outlet openings. Automatic doors are provided to cover the inlet and outlet openings, and the opening and closing of the doors is selectively controlled such that only one of the doors will be open at any one time during the spray coating operation. The introduction of the coating composition into the chamber creates a predetermined atmosphere within the chamber which is substantially saturated with constituents of the coating material, and by means of the automatic doors and control thereof, introduction of air from the outside atmosphere into the chamber is substantially prevented to maintain a predetermined atmosphere within the chamber. The apparatus and method may also monitor the level of excess coating material within a reservoir formed in the bottom of the chamber, and actuate a coating material recirculation system which will return excess coating material to an external supply for reuse without exposure to the atmosphere outside the coating chamber. The process and apparatus provides improved coating of articles with less waste.

15 Claims, 4 Drawing Sheets

SPRAY COATING PROCESS AND APPARATUS

BACKGROUND OF THE INVENTION

This invention generally relates to an apparatus and method for spray coating articles or parts, and particularly to a spray coating apparatus which provides an enclosed atmosphere for a continuous spray coating process.

In general, it is known to spray paint articles by means of an apparatus having a conveyor system which introduces parts to an open spraying booth where a plurality of spray nozzles will coat the surfaces of the article with a paint composition. A variety of paint compositions may be used, including paints which are dispersed in various solvents or dilutents. The use of solvents may present the possible risk of explosion or health risks from overspray from the open spray booth. Alternatively, a water-based paint may be used with overspray problems presenting less of a risk, but resulting in inefficient paint utilization when such overspray is exhausted to the atmosphere. Open chamber spray-coating apparatus, with the associated overspray problems, provide a relatively wasteful coating apparatus and process.

Attempts have been made to contain the overspray in closed chamber apparatus, having inlet and outlet openings. Attempts have been made to limit the escape of coating material through the inlet or outlet such as by air or water curtains. In such a system, coating material within the air of the spray booth can be circulated and possibly reclaimed. Such attempts have required a curtain of fluid at a discharge outlet of an air circulation system or make up unit associated with the spray booth, or the use of an air curtain at the open entrance and exit to the spray booth. Although the provision of an air curtain at the entrance and exit openings of the chamber does increase efficiency, the high-volume air flow of such systems still results in loss or escape of coating material and may not eliminate safety or environmental risks. The circulation of air within the spray chamber also results in an undesirable atmosphere within the chamber which allows curing of the coating composition within the chamber.

Efforts have also been made to recycle excess coating material which has not been applied to a part. Efforts to recycle coating material include providing the supply of coating material in a reservoir formed in the bottom of a coating chamber, with excess material falling into the reservoir. Alternatively, an open return drain is coupled to an external supply of coating material. In each of these cases, the recycled coating material is exposed to conditions which allow it to begin curing, possibly preventing it from being reused in the system or resulting in clogging of spray nozzles or other systems of the apparatus.

Other disadvantages of known coating processes and apparatus include the inability to readily modify the position of spray nozzles within a coating chamber to a desired position relative to a part to be coated. Depending upon the configuration of a part to be spray coated, it would be desirable to allow selective repositioning of spray nozzles within the coating chamber for optimizing the coating process relative to any particular article being coated. Further, spray nozzles used in prior art apparatus are susceptible to being clogged by the coating material, requiring the nozzles to be cleaned which generally results in halting operation of the machine for affecting such cleaning procedures. Regular cleaning of the apparatus is also required, resulting in significant undesirable dowtime in a continuous coating operation.

SUMMARY OF THE INVENTION

Based upon the foregoing, it is a main object of the invention to provide an apparatus and method for spray coating articles which more efficiently utilizes coating material by maintaining predetermined atmospheric conditions within a closed coating chamber to prevent coating material from curing and to keep it in a reusable state.

The apparatus for spray coating articles generally comprises a housing defining a closed coating chamber, the coating chamber having inlet and outlet openings. Automatic doors are provided to cover the inlet and outlet openings, and the opening and closing of the doors is selectively controlled such that only one of the doors will be open at any one time during the spray coating operation. The apparatus further includes means for supplying a coating composition to the coating chamber for coating of articles therein. The introduction of the coating composition into the chamber creates a predetermined atmosphere within the chamber which is substantially saturated with constituents of the coating material, and by means of the automatic doors and control thereof, introduction of air from the outside atmosphere into the chamber is substantially prevented to maintain a predetermined atmosphere within the chamber. Other novel aspects of the apparatus are also presented in the preferred embodiment of the invention.

The invention also relates to a method of spray coating articles which comprises the steps of introducing an article to be spray coated into a closed coating chamber through an inlet opening by selective opening of a door covering the inlet opening. A coating material is supplied into the chamber to surface coat the article, and thereafter the coated article is removed from the chamber through an outlet opening by selective opening of a door covering the outlet opening. The operation of the doors covering the inlet and outlet openings are controlled in a manner such that at least one of the doors is closed at all times to maintain predetermined atmospheric conditions within the coating chamber. The method may also include the step of monitoring the level of excess coating material within a reservoir formed in the bottom of the chamber, and actuating a coating material recirculation system which will periodically return excess coating material in small amounts to a sealed external supply for reuse without exposure to the atmosphere outside the coating chamber.

BRIEF DESCRIPTION OF THE DRAWINGS

The objects and advantages of the invention will become apparent upon a further reading of the detailed description of preferred embodiments, in conjunction with the drawings, wherein.

DETAILED DESCRIPTION OF THE INVENTION

Figure 1:
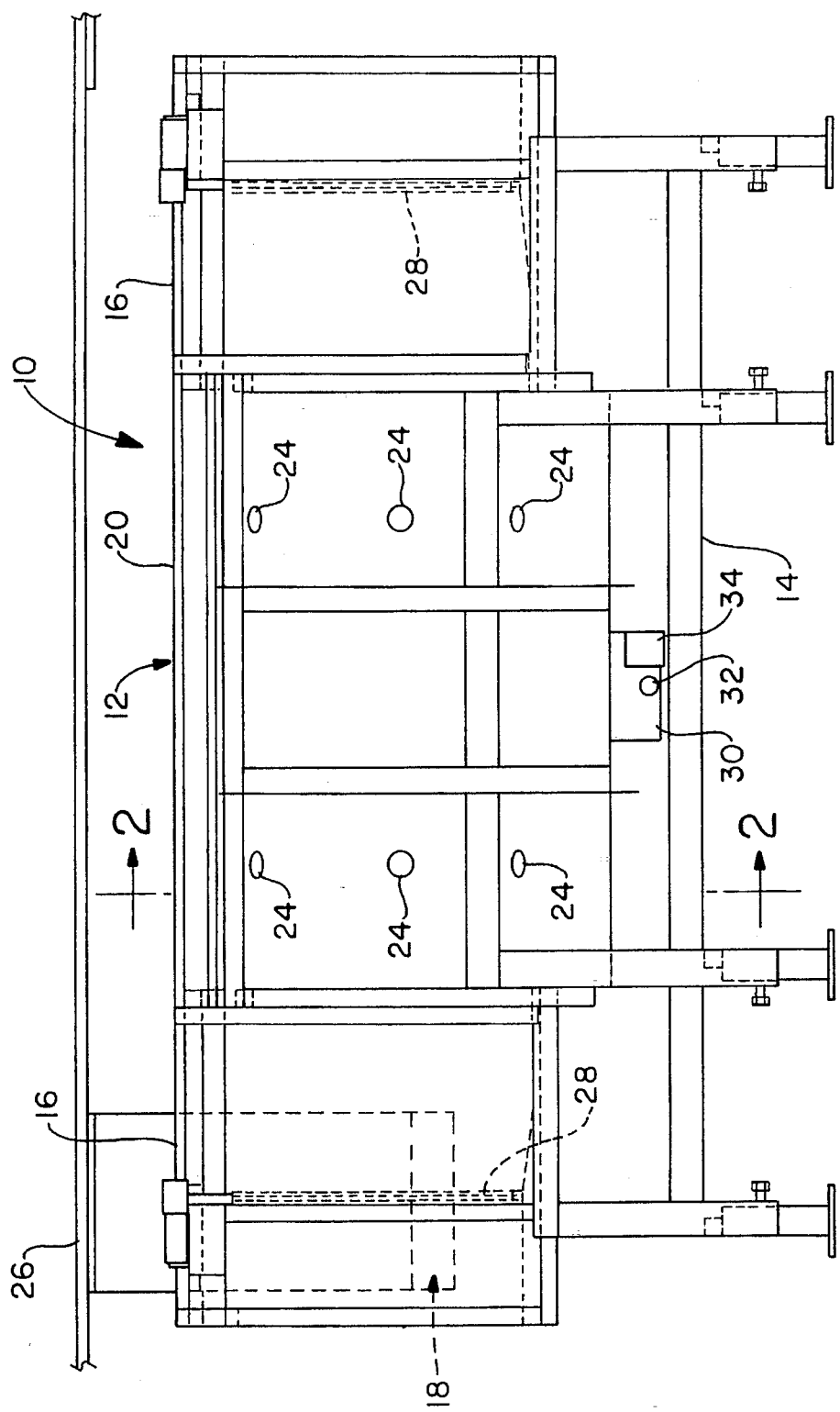
FIG. 1 is a side elevational view of a preferred embodiment of the spray coating apparatus.
Figure 2:
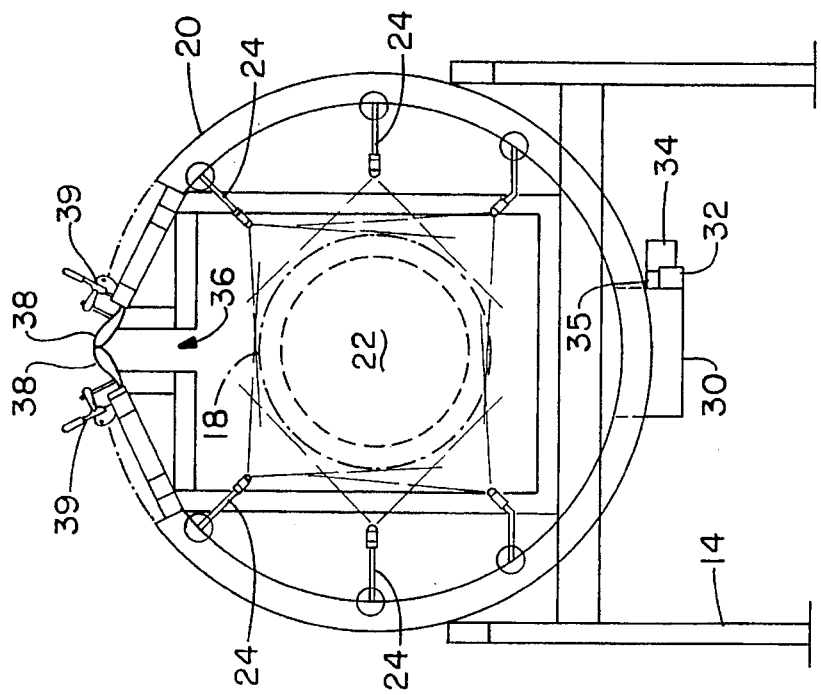
FIG. 2 is a cross-sectional view taken along line 2—2 of FIG. 1.

Turning now to FIGS. 1 and 2, a preferred embodiment of the coating apparatus is generally designated 10, and comprises a housing 12 supported on a base 14. The housing 12 comprises entrance and exit vestibules 16 and a center section 20 in which is defined a closed coating chamber 22. In the preferred embodiment, the coating chamber 22 is an elongated cylindrical chamber through which articles to be coated are passed on a suitable continuous conveyor system 26. The cylindrical configuration of the coating chamber 22 allows a plurality of spray nozzles 24 to extend inwardly around chamber 22 to spray from positions which substantially surround an article 18 to be coated. A series of coating stations using a plurality of spray nozzles 24 can be used along coating chamber 22. At each coating station, at least one of the spray nozzles 24 is located below the plane of travel of the article is positioned. The cylindrical chamber 22 produces better results in fully coating an article in a continuous coating process with less coating material used, and allows easier positioning of spray nozzles 24.

The coating apparatus 10 further includes automatic entrance and exit doors 28 provided in each of the vestibules 16, which are individually supported on the base 14 in association with center section 20. At the bottom of the coating chamber 22, a return reservoir 30 is provided to collect excess coating material for reuse. The reservoir 30 includes an outlet 32 coupled to a resupply pipe which returns excess coating material to an external paint supply. A level sensor 34 is positioned in communication with the reservoir 30 via riser pipe 35 to monitor the level of excess coating material in the reservoir, and a control system returns excess coating material from reservoir 30 to an external supply via a closed return line. Coating material is returned to the external supply periodically in small amounts, leaving a predetermined amount of material in reservoir 30 to seal outlet 32.

As seen in FIG. 2, the cylindrical coating chamber 22 allows positioning of spray nozzles 24 all around the pan 18 to be coated. The nozzles 24 are preferably positioned to surround a circular zone, the size of which may vary depending on the part 18 to be coated. Each of the spray nozzles 24 has a predetermined area of coverage corresponding to its distance from the part 18. The positions of the spray nozzles 24 allow complete coverage of the article 18 with the minimum number of nozzles, and minimizes the amount of coating material necessary to fully coat the article 18. The spray nozzles 24 are also adjustable in a wide variety of ways to accommodate the variety of parts which can be coated in the apparatus.

The vestibules 16 at the entrance and exit openings of the coating chamber 22 provide an interface and buffer zone between the coating atmosphere within chamber 22 and the outside atmosphere. The butter zone created by the vestibules 16 substantially prevents excess coating material from escaping the apparatus to the outside atmosphere in conjunction with automatic doors 28 provided in each of the vestibules 16. As will be hereinafter described in more detail, the automatic doors 28 are used to selectively introduce an article 18 into the coating chamber 22 and thereafter allow the coated article to exit, while at all times maintaining at least one of the automatic doors 28 closed to prevent circulation of air into coating chamber 22. The vestibules 16 also function to contain excess coating material from the spray coating operation, allowing it to settle and flow back into the coating chamber for reuse. Any coating material which settles within the entrance or exit vestibules 16 is channeled back into the coating chamber 22, with the cylindrical walls thereof facilitating the flow of excess coating material into reservoir 30, forming a part of a coating recirculation system. To further facilitate flow of excess coating material to reservoir 30, the interior surfaces of the coating chamber 22 may be formed of a low friction material such as stainless steel or plastic, or the surfaces may be coated with a friction reducing material such as a Teflon® coating as an example. Such a surface will also facilitate cleaning operations.

The continuous coating apparatus 10 is preferably used in association with an overhead conveyor system 26. Articles to be coated are normally hung on hooks or other appropriate means, and are continuously introduced into apparatus 10 in this position. The conveyor system may be a variable speed conveyor to allow the speed of the article through the coating chamber to be modified. To accommodate such a conveyor system, the apparatus 10 may include an upper channel 36 through which the conveyor 26 passes. The channel 36 is sealed by a pair of rubber sleeves 38, each of which is preferably a sheet which is rolled back upon itself with the edges secured by means of clamping means 39 formed along channel 36. The rolled edges of each sleeve 38 contact and seal the channel 36 while allowing conveyor 26 to pass therethrough.

Figure 4:
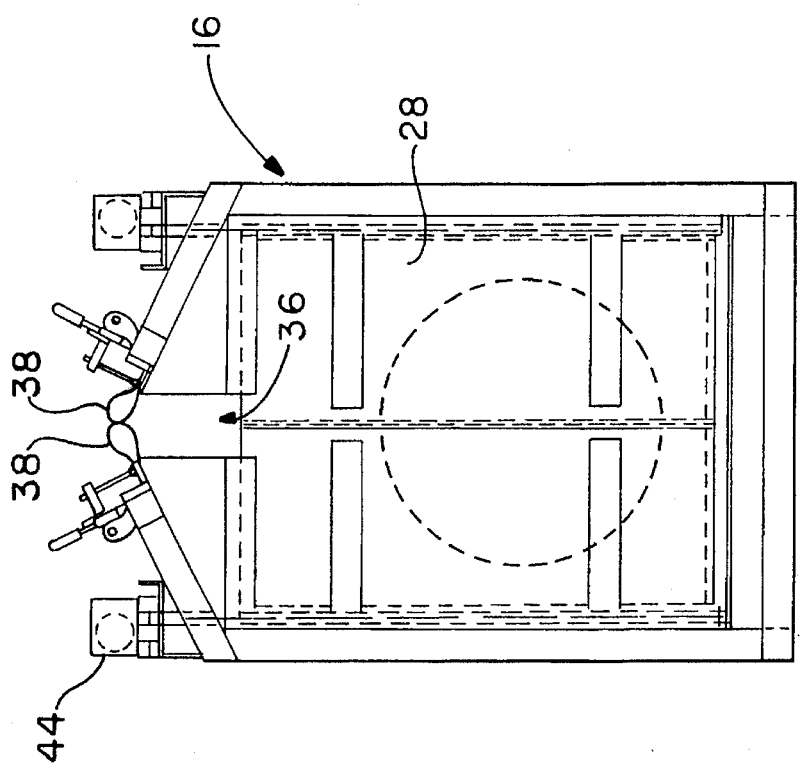
FIG. 4 is an end view of the vestibule as shown in FIG. 3.
Figure 3:
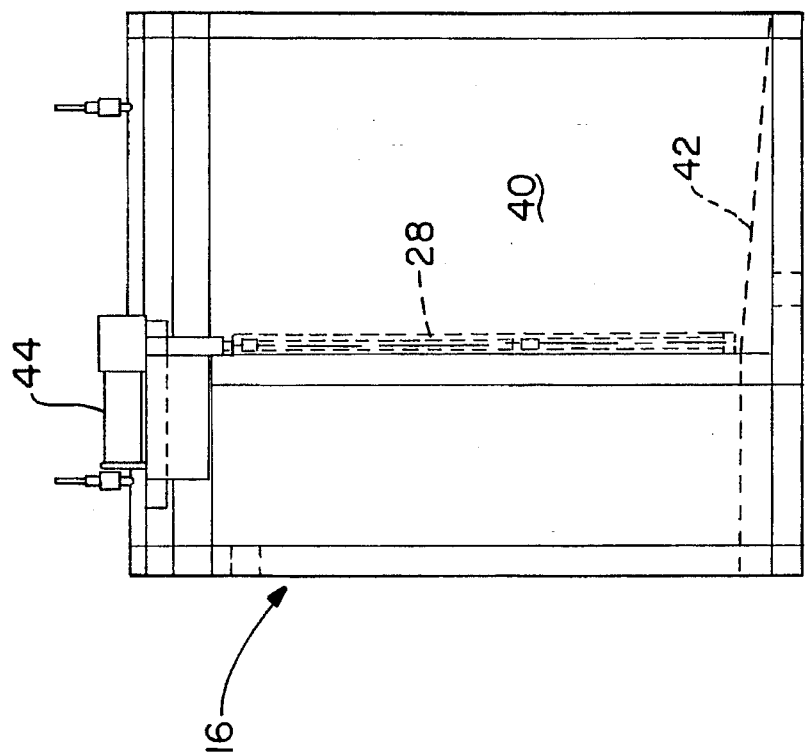
FIG. 3 is a side elevational view of an entrance or exit vestibule associated with the coating apparatus.

The entrance and exit vestibule 16 is shown in more detail in FIGS. 3 and 4. Each vestibule includes a chamber 40 through which a part to be coated passes before entering the coating chamber or immediately after exit therefrom. The bottom of the chamber 40 is provided as an inclined surface 42 which is sealed against the entrance or exit opening of the coating chamber 22 to allow any excess coating material which escapes into chamber 40 to settle and flow back into the coating chamber via surface 42. The chamber 40 is closed by automatic doors 28, each being operated by a suitable automatic door opening mechanism 44, such as a pneumatic, electric, or other suitable door operator. For the entrance vestibule 16, the automatic door 28 may include a pair of doors which are made to swing inwardly, with a suitable control system controlling operation of opening mechanism 44. For example, a part to be coated is positioned on the conveyor system 26 and may be made to trigger opening of the doors 28 upon tripping of a limit switch associated with conveyor 26 operated by passing of the article when approaching vestibule 16. The pair of doors 28 are opened simultaneously with introduction of an article, and are thereafter closed by limit switch actuation or other suitable mechanism immediately after the article has been introduced into chamber 40. Similarly, after the article is coated in coating chamber 22, it will be introduced into chamber 40 of the exit vestibule 16, and doors 28 will automatically open outwardly to allow the part to exit, and will thereafter immediately close. The doors 28 seal the interior space when closed, again facilitating maintenance of the desired atmosphere within chamber 22.

In a continuous coating operation, the opening and closing of doors 28 in the entrance and exit vestibules 16 and are sequenced such that one set of doors 28 will always be closed to inhibit or prevent air movement into or out of the coating chamber 22. The automatic doors 28 in conjunction with the buffer chamber 40 enables a predetermined environment to be established and maintained within the coating chamber 22. More particularly, a coating material is supplied to the plurality of spray nozzles 24 for dispersing coating material onto the article as it passes each of the coating stations. Upon spraying of a coating material within chamber 22, the lack of air movement within the chamber creates an environment wherein any excess coating material is maintained in a reusable state without curing of the coating material due to exposure to the exterior atmosphere. Excess coating material will settle and flow into the reservoir 30 without exposure to the external atmosphere, allowing it to be recycled and reused with less waste and higher production capabilities. The continuous spraying of coating material in chamber 22 creates an atmosphere therein which is substantially saturated with coating material. Articles 18 passing through chamber 22 will be coated by direct impingement of coating material from nozzles 24 as well as settling of coating material thereon which is dispersed in the coating chamber atmosphere. Excess coating material is accumulated in the bottom of chamber 22 and in reservoir 30 for recirculation to the external supply. Alternatively, a sensor (not shown) may be used to indicate when a part is entering the coating chamber 22 to initiate spray coating of the part only when it is entering chamber 22.

The entrance and exit vestibules 16 also facilitate cleaning and maintenance operations, in that they are modular and can be removed and replaced with a minimum of down time in machine operation. The interchangeability of the modular vestibules allows maintenance operations to be performed on a particular vestibule 16 while another is used in its place for continuous operation of the machine. Further, the doors 28 may be arranged for easy removal, clean-up and replacement.

Figure 5:
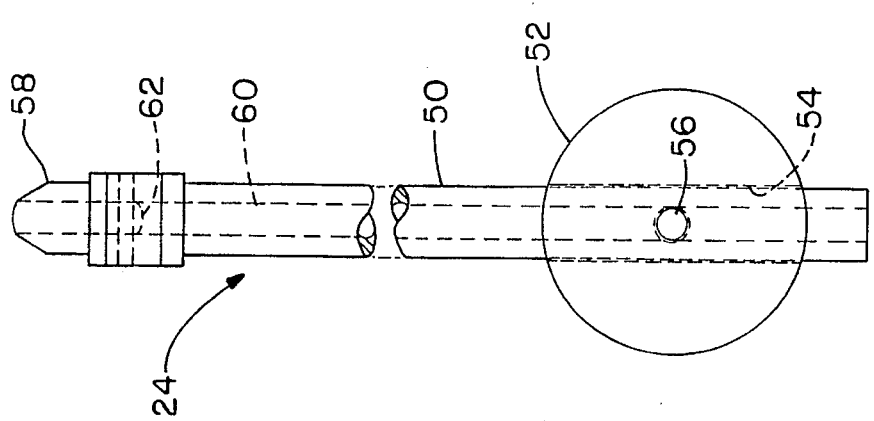
FIG. 5 is an enlarged view of a spray nozzle of the coating apparatus.

A preferred spray nozzle 24 for use in the apparatus 10 is shown in FIG. 5, which includes an elongated tubular body 50 movably disposed in a spherical anchoring member 52. The anchoring member 52 is secured within a corresponding socket formed in the coating chamber 22 of the apparatus, allowing the tubular body 50 to extend into the coating chamber. The anchoring member 52 is preferably sealed in the socket to prevent ingress of air. The anchoring member 52 is rotationally adjustable within its seated position to adjust the orientation of the tubular body 50 within coating chamber 22. Additionally, the tubular member 50 is longitudinally adjustable within an aperture 54 formed in anchoring member 52, with its position being fixed by means of set screw 56 or the like. A spray nozzle tip 58 is secured to the distil end of tubular member 50, with a paint supply channel 60 extending thereto. The nozzle tip atomizes coating material which is supplied to nozzle 24 at a predetermined pressure. For example, using a water-based paint to coat parts in apparatus 10 may require a pressure of 600 psi to airlessly atomize the paint for application. A filter 62 may be positioned adjacent nozzle tip 58, to insure that no large particulates or other foreign matter are introduced to the nozzle tip 58 which would cause clogging thereof. The arrangement of the spray nozzles 24 also allows selective removal of the entire nozzle assembly during operation of the machine to allow any clogged nozzle 24 to be cleansed without having to halt operation of the machine. The anchoring member 52 may be selectively removed along with the entire nozzle assembly, allowing continuous operation while maintenance and cleaning can be performed. This arrangement also eliminates the possibility of other spray nozzles becoming clogged upon halting of the coating operation to unclog a single spray nozzle 24.

Figure 6:
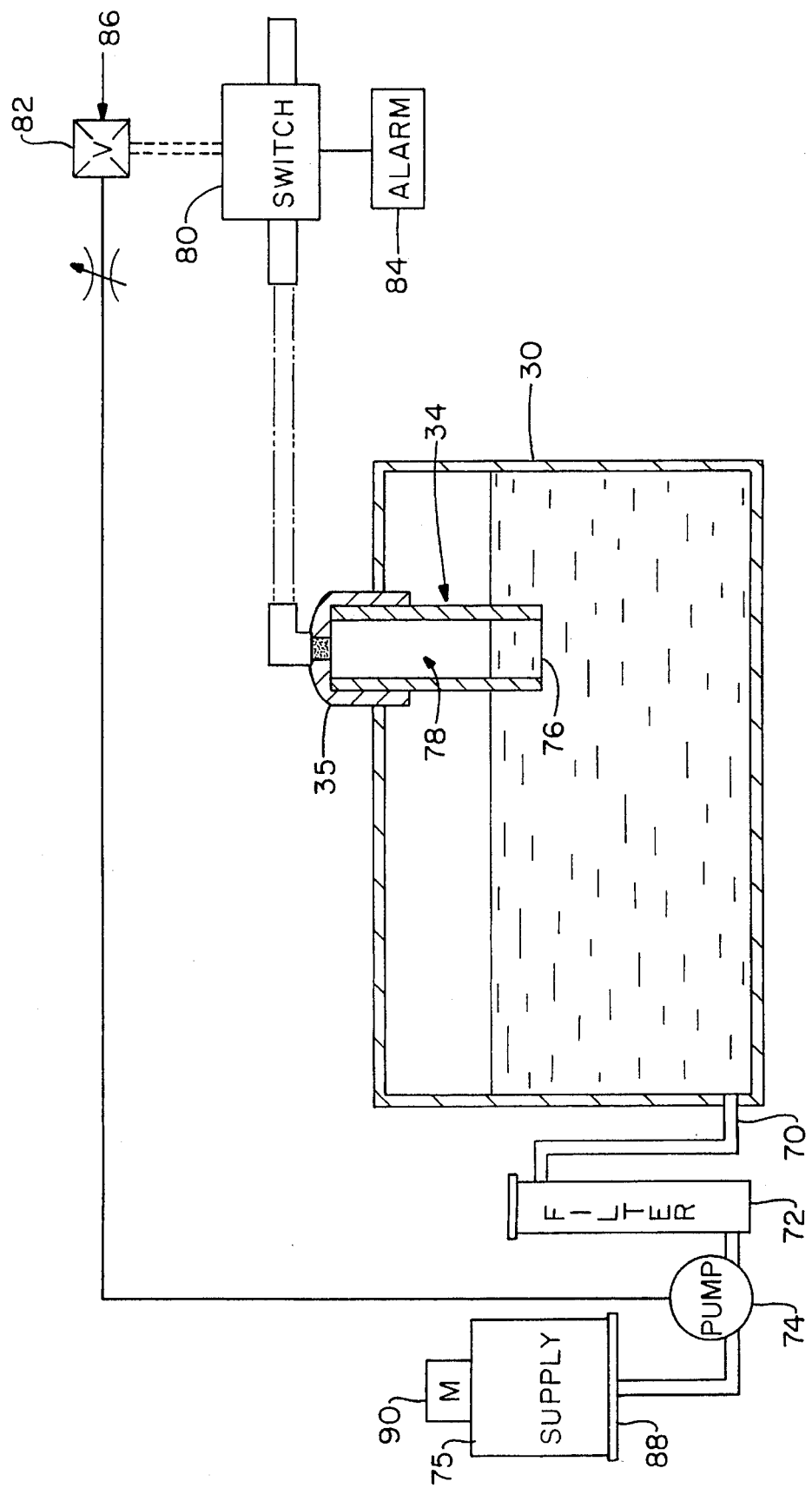
FIG. 6 is a schematic view of the recirculation system of the coating apparatus.

Turning now to FIG. 6, the coating material recirculation system of the apparatus will be described. As previously mentioned, excess coating material which does not adhere to an article within the coating chamber 22 will be maintained in its sprayable condition and will settle in the reservoir 30 at the bottom of chamber 22. The outlet pipe 70 is coupled through a scaled filter 72 and return pump 74 to an external paint supply 75. Disposed in communication with reservoir 30 is a level sensor 34, which may of any suitable type. In a preferred embodiment, the level sensor 34 includes a riser pipe 35 connected to the reservoir 30 (shown in FIG. 2) to allow excess coating material to flow into it. The sensor 34 may be an inverted cylindrical member having a bottom open end 76 positioned a predetermined position from the bottom of the riser 77. The sensor 34 has a hollow channel 78 into which excess coating material will rise. The area 78 of sensor 34 is coupled to a low pressure switch generally designated 80. The pressure switch 80 can sense changes in pressure created by the raising or lowering of coating material within area 78 of the sensor 34. The switch 80 in turn controls operation of suitable control system to recirculate coating material to an external supply 75 at a controlled rate for reuse. As an example, a pneumatic control system may include a three-way valve 82, which is opened when coating material in reservoir 30 reaches a predetermined height. For example, the valve 82 is used to sense from 0.5 inches to 1.5 inches of coating material level from the bottom 76 of sensor 34 to insure that the level of coating material within reservoir 30 is well above the outlet opening to resupply pipe 70 in the recirculation system. Valve 82 may be coupled to an air source at 86, and operates a pneumatically driven return pump 74 to return coating material at approximately 0.5 gallons once every cycle during a continuous coating operation. The cyclic return of excess coating material to external supply 75 maintains the level thereof above the return supply outlet 70 to prevent the introduction of air into the coating which may cause foaming or initiate curing of the coating. The level sensor 34 and associated switch 80 may also be positioned directly in reservoir 30 to monitor the level of coating therein. The sensor 34 can also determine a high level of coating material, and may be made to set off an alarm 84 or other appropriate indication to signal that the level of coating material within the reservoir has reached or exceeded a predetermined level above a normal pump return level set for the system. This indication will give early warning to any problems associated with the coating material recirculation system.

The liquid level sensor 34 allows recirculation of coating material and monitoring of liquid level without allowing air to come into contact with the coating material to be recirculated. Resupply to an external paint supply is performed in a closed system. By maintaining the atmosphere within coating chamber 22 highly saturated with the coating material, and not allowing outside air to come into contact with the coating material in the reservoir 30, or as it is being pumped back to an external supply via the recirculation system, maintains the material in a reusable state to minimize waste. In the preferred embodiment, the external supply of coating material 75 is a tote having a paint or other coating material therein. The tote is placed upon electronic scales 88 to allow the capacity of the tote to be constantly monitored. In this manner, an operator can tell which tote is in use and how much paint is left in the tote without opening the tote to the air. The totes are provided with air mixing motors 90 installed in the sealed lid, and an air supply is merely coupled to the mixing motor to mix and prepare the paint for use. In the recirculation system, the coating material return hose 70 and return pump 74 will have quick connect fittings to again prevent air from coming into contact with the coating material until it leaves the coating machine on a finished part. In each aspect of the apparatus, the external atmosphere is prevented from contacting excess coating material to maintain it in a reusable state. It has been found that waste of coating material can be held to 5% or less, greatly increasing efficiency and cost-effectiveness of the operation. Similarly, the ability to perform maintenance and cleaning without halting operation of the machine allows greater production in a continuous operation.

Based upon the foregoing, the coating apparatus may be used in a continuous spray coating process wherein articles to be coated are carried on a suitable conveyor system for introduction into the machine. Before coating of a part, a step of prewashing the part to remove any dirt from the surface thereof may be performed, with the step of prewashing also heating the part to an elevated temperature. In the wash cycle, the part is washed under high-pressure using a high-temperature solution comprising a soap and a wetting agent, resulting in fast heat transfer from the cleaning solution to the pan. Thereafter, the step of heat drying the washed part raises the temperature of the part to a predetermined temperature for introduction into the coating chamber. It has been found that for a particular coating material, the temperature of the part may affect application of coating material thereto. For example, if the part to be coated is too hot, the coating material may dry too quickly and crinkle, or alternatively, if the part is too cool, the coating material may not readily adhere thereto, causing dripping of coating material from the part. For example, with a water-based paint, such as a formulation XN-174 produced by United Paint Company, the temperature of the part should be in the range between 110°–145° F. for proper coating in the process. The step of heat drying the parts before introduction into the coating machine also removes excess moisture from the surface. The coating machine is supplied with a coating material from an external supply source, such as the sealed tote previously mentioned. The coating material may be filtered as it leaves the tote, and is thereafter fed to high-pressure pumps for supplying the material to the spray nozzles 24 of the apparatus. The material may again be filtered by means of high-pressure filters associated with the supply pumps to insure that no foreign material is supplied to the nozzle tips. In the supply of coating material front the external source, the supply line is sealed from the external source, with the supply filters being sealed so no exposure to the external atmosphere occurs.

The coating machine 10 may operate to spray coating material continuously within the coating chamber. The conveyor operates limit switches to open the automatic doors for introduction of the part to the coating chamber, and thereafter to automatically close the doors alter the part has been introduced. After coating, the exit doors are opened to allow exit of the part and thereafter immediately closed. At all times, either the entrance or exit door will be closed. The coated part may then be introduced into a drying tunnel to harden the coating material on the part more quickly. The variable speed conveyor along with the characteristics of the coating machine allow the thickness of coating material on the part to be accurately controlled to allow uniform coating at a predetermined thickness. Better control over the film thickness will allow conservation of coating material in the process. During operation of the apparatus, excess coating material within the coating chamber is constantly recirculated to the external supply source via the closed recirculation system.

Although preferred embodiments of the invention have been described, variations and modifications exist within the scope of the invention as defined in the following claims.

What is claimed is:

1. A method of spray coating articles, comprising the steps of:
   (1) introducing an article to be spray coated into a closed coating chamber through an inlet of said chamber, by selective opening of a door covering said inlet opening;
   (2) supplying a coating material into said chamber to surface coat said article,
   (3) removing said coated article from said chamber through an outlet opening of said chamber by selective opening of a door covering said outlet opening,
   (4) controlling operation of said doors covering said inlet and outlet openings such that at least one of said doors is closed at all times to substantially prevent movement of air into or out of said coating chamber to maintain any excess coating, material in a reusable state by preventing exposure thereof to air, and
   (5) collecting excess coating material supplied into said chamber in a bottom reservoir coupled to a recirculation system, and controlling recirculation of excess coating material back to means to supply said coating material such that said excess coating material is maintained within said reservoir between minimum and maximum levels above an outlet opening in said bottom reservoir.

2. The method as in claim 1, further comprising the steps of:
   prewashing the article to be coated with a cleaning solution at a first temperature, and preheating and drying said article prior to introduction into said coating chamber, such that said article is introduced into said chamber at a second temperature.

3. A method of spray coating articles, comprising the steps of:
   (1) introducing an article to be spray coated into a closed coating chamber through an inlet opening of said chamber,
   (2) supplying a coating material into said chamber from an external supply source,
   (3) removing said coated article from said chamber through an outlet opening,
   (4) collecting excess coating material in a bottom reservoir of said chamber,
   (5) preventing exposure of said excess coating material to the atmosphere so as to maintain said excess coating material in a sprayable, reusable state, wherein said step of preventing comprises the steps of:
      (i) maintaining the level of excess coating material within said reservoir between minimum and maximum levels above an outlet opening of said bottom reservoir, and
      (ii) recirculating excess coating material to said external supply for reuse, while maintaining said minimum level of excess coating material within said reservoir.

4. The method of claim 1, wherein,
   said step of supplying a coating material into said chamber includes pumping of coating material from an external supply tank to supply coating material under pressure to a plurality of spray nozzles positioned within said chamber, wherein said external supply tank is closed to the atmosphere, and pumping of said coating material to said chamber is performed without exposure of said coating material to the atmosphere.

5. The method as in claim 3, wherein,
   said step of recirculating said excess coating material includes circulating said excess coating material through at least one filter, said at least one filter being sealed to prevent exposure of said coating material to the atmosphere.

6. The method as in claim 1, further comprising the steps of:

collecting excess coating materials supplied into said chamber in a bottom reservoir coupled to a recirculation system, and recirculating excess coating material to an external supply tank which supplies coating material under pressure to said chamber, said step of recirculating excess coating material being performed without exposing said coating material to the external atmosphere.

7. The method as in claim 1, further comprising the steps of:

introducing a coated article from said chamber into a drying tunnel to harden the coating material on the article.

8. The method as in claim 3, wherein, said step of supplying coating material into said chamber is performed without exposing said coating material to the external atmosphere.

9. The method as in claim 3, wherein, said step of supplying a coating material into said chamber includes pumping said coating material under pressure to a plurality of spray nozzles positioned within said chamber, said step of pumping said coating material being performed without exposing said coating material to the external atmosphere.

10. The method as in claim 9, wherein, said coating material is pumped through at least one filter to remove any foreign material contained within said coating material, said at least one filter being sealed to prevent exposure to the external atmosphere.

11. The method as in claim 3, wherein, said step of introducing an article is performed by selective opening of a door covering an inlet opening of said chamber, and said step of removing said coated article is performed by selective opening of a door covering an outlet opening of said chamber, wherein at least one of said doors covering said inlet or outlet openings is closed at all times to maintain an atmosphere within said coating chamber which is substantially saturated with said coating material.

12. The method as in claim 1, wherein, said step of controlling operation of said doors includes providing said doors as automatic doors controlled by an automatic door opening mechanism, wherein said automatic door opening mechanism is controlled to automatically open said door covering said inlet opening for introduction of said article and to automatically close said door immediately after said article is introduced, and to automatically open said door covering said outlet opening to allow said coated article to exit and to automatically close said door immediately after exit of said article.

13. The method as in claim 12, wherein, said automatic door opening mechanism is controlled by means of switches actuated by a conveyor on which said articles to be coated are positioned.

14. The method of claim 3, wherein, said coating material is supplied from an external supply tank which is sealed from the atmosphere, and said step of recirculating excess coating material supplies said excess coating material to said external supply tank without exposing said excess coating material to the atmosphere.

15. The method of claim 3, wherein, said step of maintaining the level of excess coating material includes the step of monitoring the level of said excess coating material in said reservoir and controlling said step of recirculating said excess coating material to maintain said level.

* * * * *